(12) United States Patent
Lang et al.

(10) Patent No.: US 11,764,000 B2
(45) Date of Patent: Sep. 19, 2023

(54) CAPACITOR SEALS

(71) Applicant: Solaredge Technologies Ltd., Herzeliya (IL)

(72) Inventors: Joel Lang, Givataim (IL); Ronit Romm, Jerusalem (IL); Bryon Gomberg, Kfar Sava (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 17/502,467

(22) Filed: Oct. 15, 2021

(65) Prior Publication Data

US 2022/0122780 A1  Apr. 21, 2022

Related U.S. Application Data

(60) Provisional application No. 63/092,593, filed on Oct. 16, 2020.

(51) Int. Cl.
*H01G 9/10* (2006.01)
*H01G 9/08* (2006.01)

(52) U.S. Cl.
CPC ............... *H01G 9/10* (2013.01); *H01G 9/08* (2013.01)

(58) Field of Classification Search
CPC .................................. H01G 9/08; H01G 9/10
See application file for complete search history.

(56) References Cited

U.S. PATENT DOCUMENTS

| | | | | |
|---|---|---|---|---|
| 2,758,149 A * | 8/1956 | Brennan | ............ | H01G 9/10 174/50.57 |
| 2,884,575 A * | 4/1959 | Julius | ............ | H01G 9/10 220/228 |
| 3,015,758 A * | 1/1962 | Roberta | ............ | H01G 9/10 429/94 |
| 3,333,164 A * | 7/1967 | Garand | ............ | H01G 9/10 29/25.03 |
| 3,778,683 A * | 12/1973 | Buice | ............ | H01G 9/08 29/25.03 |
| 3,922,773 A * | 12/1975 | Marien | ............ | H01G 9/08 29/25.03 |
| 2006/0034036 A1 | 2/2006 | Miura et al. | | |
| 2012/0276441 A1 * | 11/2012 | Kim | ............ | H01M 50/171 429/174 |
| 2017/0271085 A1 | 9/2017 | Tsubaki et al. | | |

FOREIGN PATENT DOCUMENTS

JP       H09283385 A       10/1997
KR     20130034459 A  *    4/2013

OTHER PUBLICATIONS

Mar. 14, 2022—Extended EP Search Report—EP App. No. 21202693.4.

* cited by examiner

*Primary Examiner* — Eric W Thomas
(74) *Attorney, Agent, or Firm* — Banner & Witcoff, Ltd.

(57) ABSTRACT

Electrolytic capacitors may use a canister and a lid to confine an electrolyte and prevent the electrolyte from evaporating during use, and an improved seal between the canister and the lid may be achieved by increasing the surface area of the seal. For example, the surface area of the seal may be increased by changing the shape and/or thickness of the canister edge. For example, the surface area of the seal may be increased by changing the shape of an elastomer layer of the lid and/or adding an annular protuberance at the circumference of the lid. For example, the surface area of the seal may be changed by changing the process for forming the edge during the capacitor sealing.

16 Claims, 4 Drawing Sheets

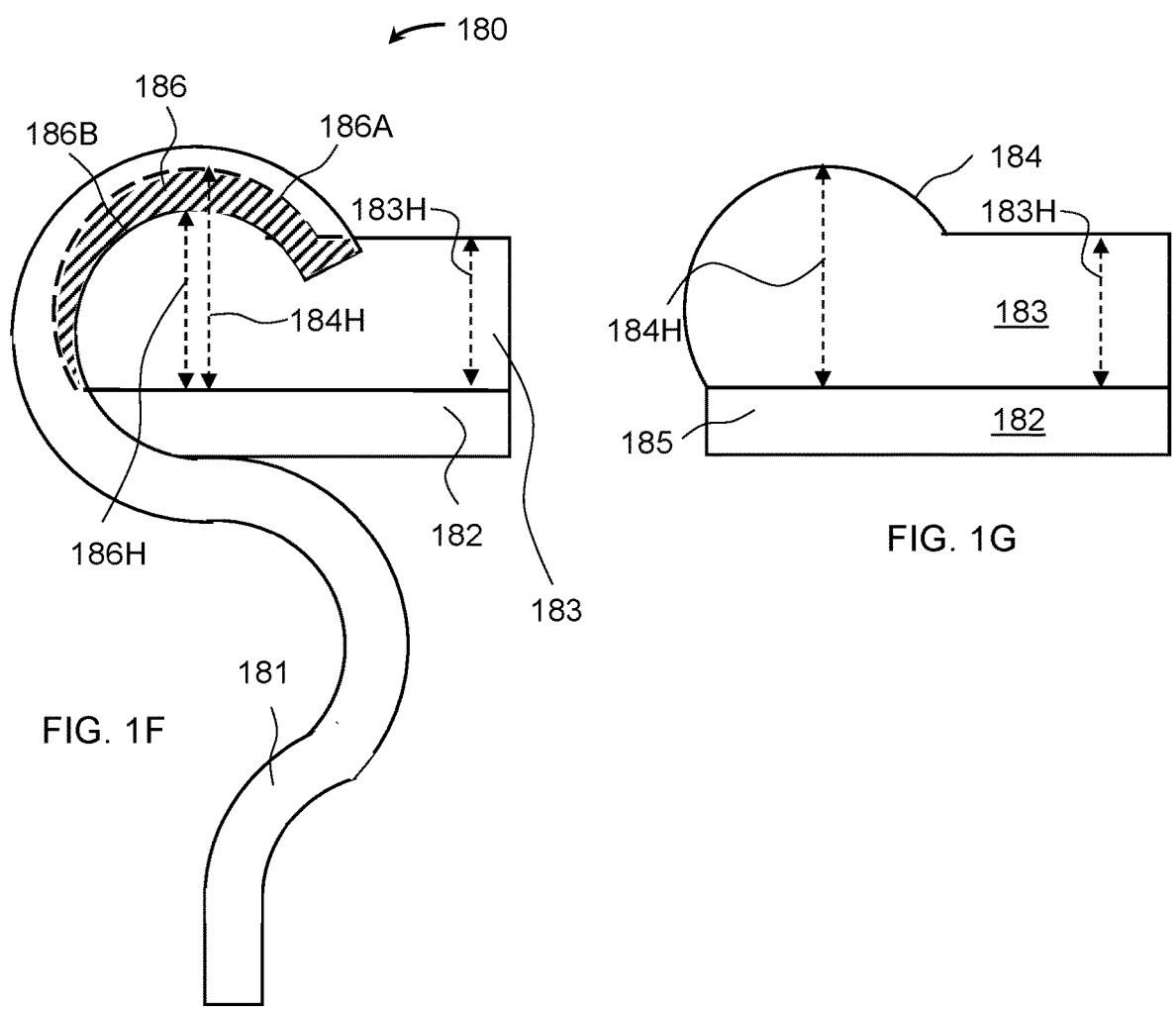

CAPACITOR SEALS

BACKGROUND

The present disclosure relates to the field of electrical components and devices containing electrical components.

Capacitors include electric components that store electrical energy (such as, as charge on parallel plates of conducting electrodes, such as an anode and a cathode). Electrodes may be separated by separator paper, dielectric layers, or electrolyte materials. Sheets of electrodes and separators may be packed, folded or rolled into various shapes to form the internal elements of electrolytic capacitors. The internal elements may be packed in an inner cavity of a case, such as a canister closed with a lid, or packed in a sealed enclosure or pouch. The internal elements may also include tabs configured to electrically connect the electrodes to terminals traversing the case of the capacitor.

SUMMARY

The following summary is a short summary of some of the inventive concepts for illustrative purposes only and is not an extensive overview, and is not intended to identify key or critical elements, or to limit or constrain the inventions and examples in the detailed description. One skilled in the art will recognize other novel combinations and features from the detailed description.

A method for manufacturing capacitors may be described herein, wherein the method may provide a thick seal interface between a canister and a lid. A capacitor canister may be pre-fabricated with an annular edge of the canister having material that is thicker than the body of the canister. Since the canister may have a cylindrical shape, the edge of the canister may form an annular edge surrounding the canister shell and on the opposite side of the canister base. A capacitor canister may be formed with a canister thickness that may exceed a canister thickness designed only for mechanical integrity of the capacitor canister. For example, an electrolytic capacitor may comprise a canister thickness between 0.1 millimeters and 0.4 millimeters (mm) thick when configured for supporting the mechanical integrity of the canister, but an increased thickness of between 0.4 mm to 5.0 mm may be used for an enhanced seal capacitor. A forming method may be used to create a capacitor canister with an annular edge that is between 10% and 1000% thicker than the body of the canister. A combined drawing and forming method may be used to create a capacitor canister.

The method may comprise preforming the canister edge to increase contact area with the lid. For example, besides the sealing of the lip where the edge of the canister is rolled towards the lid, a preforming step before the sealing may roll or fold the edge to increase the seal contact area between the edge of the canister and the lid. For example, the edge of the capacitor canister may be preformed with a lip to curl towards the cylindrical axis of the capacitor canister. In another example, the edge of the capacitor canister may be preformed to curl outwards, away from the cylindrical axis of the capacitor canister. The edge of the capacitor canister may be folded one or more times to increase the thickness of the edge. For example, the edge of the capacitor canister may be rolled one or more times (inwards or outwards) to increase the thickness of the edge.

The method may produce a capacitor canister comprising a preformed edge that is thicker than the capacitor canister edge prior to preforming (such as, thicker than a canister thickness used in other known methods). The capacitor canister may comprise an edge that is processed or preformed to increase the surface area of an edge (such as, when used to form a seal against an elastomer adhered to the lid of the capacitor). The lid may include a rigid base to provide a counter force against the edge of the canister when the edge is curled towards the lid to seal the capacitor canister. The compression of the canister edge against the lid may be directed in the opposite direction from the canister edge prior to sealing. For example, the edge after sealing is directed towards the opposing flat edge of the cylindrical canister (the canister base). For example, a cylindrical canister may comprise a flat base and a cylindrical shell with an opening opposing the flat base. A lid may be placed over the opening and the edge of the canister bent backwards towards the flat base. The edge may thus secure the lid in place, and an elastomer covering the rigid base may form a compressive seal between the edge and the rigid base of the lid.

The method may comprise calculating a surface area of the edge of the canister against the elastomer sufficient to form a seal with a calculated lifetime. The method may use a model of diffusion through a compressed elastomer seal that calculates the surface area needed based on the desired lifetime, the elastomer properties, the electrolyte used, or the working conditions of the capacitor (such as, current, voltage, temperature, etc.) A use case and working specification may determine a minimum required surface area of the interface between the edge and the lid. A size, shape, edge thickness, etc. may determine the method of manufacturing from those described herein (such as, edge folding, rolling, corrugating, or stamping).

As noted above, this summary is merely a summary of some of the aspects and features described herein. It is not exhaustive, and it is not a limitation on the claims.

BRIEF DESCRIPTION OF THE DRAWINGS

Certain features, aspects, and advantages of the present disclosure will become better understood with regard to the following description, claims, and drawings. The present disclosure is illustrated by way of example, and not limited by, the accompanying figures. In the drawings, like numerals reference similar elements.

FIG. 1F shows an example sealing technique for increased edge surface area.

FIG. 1G shows an example lid including a protuberance for increased edge surface area.

DESCRIPTION

Figure 1A:
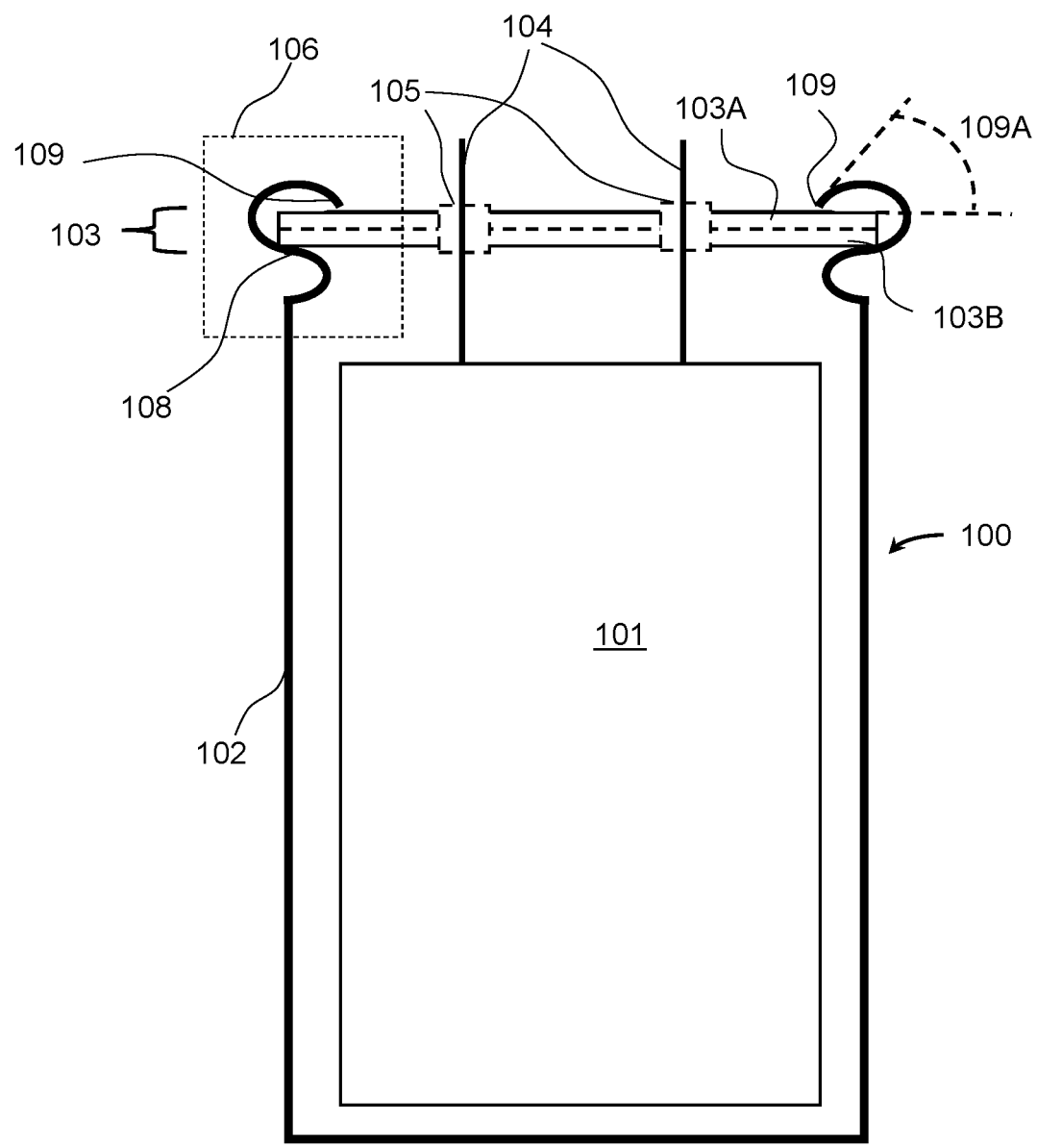
FIG. 1A shows a cross-section view of an example capacitor with increased edge surface area.

As used herein, the terms isolating layer, coating, tape, film, and covering may be used interchangeably to mean a layer of isolating material covering a tab and the region of the electrode adjacent to the tab. The term case may be used to refer to a canister/pouch, cap/seal, or enclosure.

Capacitor canisters are manufactured using deep draw methods on a blank, producing a cylindrical shell and a flat base on one end of the shell. The other end of the shell comprises an annular edge and allows loading the internal components into the internal cavity of the canister. After the canister is loaded with the internal components. A lid is attached to the electrode leads and placed over the open end of the canister. Optionally the lid is attached prior to loading the internal components. A groove is created in the canister shell to set the height of the internal cavity of the canister, and prevent the lid from affecting the internal components. The groove provides a counterforce for sealing the capacitor lid. The capacitor canister is sealed by rolling the edge of the canister towards the center axis of the canister and then down onto the lid (such as towards the base). The lid comprises a rigid base and an elastomer coating facing the outside of the capacitor. When the edge of the canister is rolled to press against the lid, a seal is created between the by the edge and rigid base compressing the elastomer.

Described herein are technical solutions that increase the seal integrity and hence the lifetime of the capacitor. For example, the thickness of the capacitor canister edge may be increased by 20-300% to increase the seal integrity. For example, the angle between the canister edge and the lid may be different from 90 degrees, such as between 10-80 degrees smaller or larger than 90 degrees. For example, the elastomer layer may incorporate an annular protuberance of elastomer material so that the rolling of the canister edge to seal the capacitor compresses the elastomer protuberance along the inside curvature of the canister edge seal.

Capacitors rated between 125 volts and 600 volts and having capacities between 0.5 millifarads and 5 millifarads may use aluminum canisters with a 0.4 millimeter or 0.5 millimeter canister thickness. To increase the seal quality, and thus the time of operation at a specific temperature, a canister of greater thickness may be used. Further configuring the angle between the canister edge and the lid to be oblique (such as not perpendicular or 90 degrees) may further increase the seal quality and thus time of operation at the specified temperature. For example, a 1 millimeter (mm) canister thickness will increase the seal area by 100% over a 0.5 mm thick canister, and further configuring an angle of 45 degrees between the canister edge and the lid will increase the area another 41%, for a combined total increase in seal area of 181%. Further adding an annular ring to the elastomer to include the full curvature of the canister seal in computing the area may increase the seal area a further 200%, for a total increase of 460% in seal area. So for example a capacitor that was rated for 5,000 hours at a temperature of 105 degrees centigrade may increase the time of operation rating to 28.000 hours at the same temperature when there is a linear relationship between the seal area and time of operation. For example, selectively increasing the can thickness, using an oblique angle between the canister edge and lid, and adding an annular protuberance to the elastomer on the lid may be used to increase the time of operation to the requirements of a desired application in the most effective manner. The specific thickness, angle, and protuberance may be configured based on the intended applications other requirements, such as vibration resistance, weight of components, environmental operating conditions, and relative solution costs for each separate aspect (thickness, angle, and protuberance).

Reference is now made to FIG. 1A, which shows a cross-section view of an example capacitor 100 with increased edge contact area. Capacitor 100 may comprise an internal element 101 and an enclosing canister 102. Canister 102 may restrain lid 103 to seal and protect internal element 101. Electrical conductors 104 (which may be leads, terminals, wires, etc.) may electrically connect internal element 101 electrodes to an external electrical circuit, and may be isolated from lid 103 using isolating material 105. Lid 103 may comprise an elastomer layer 103A and a rigid base 103B. Lid 103 may be restrained by canister 102 using an internal protrusion 108 providing counter support for seal edge 109 pressing against lid 103, and more specifically pressing against the elastomer layer 103A. Seal edge 109 and the region leading up to the seal edge 109 may be described as a retaining lip formed to secure the lid 103 to the internal protrusion 108. Internal protrusion 108 extends the canister into the central cavity by grooving the canister at the configured distance from the flat base. To increase the edge contact area with the lid, an oblique angle 109A may be chosen between the edge 109 and the lid 103. Region 106 shows a field of view that may be depicted in FIG. 1B. An elastomer material may be an ethylene propylene diene monomer (EPDM) rubber, or another type of synthetic rubber. Alternately, a natural rubber may be used.

Figure 1B:
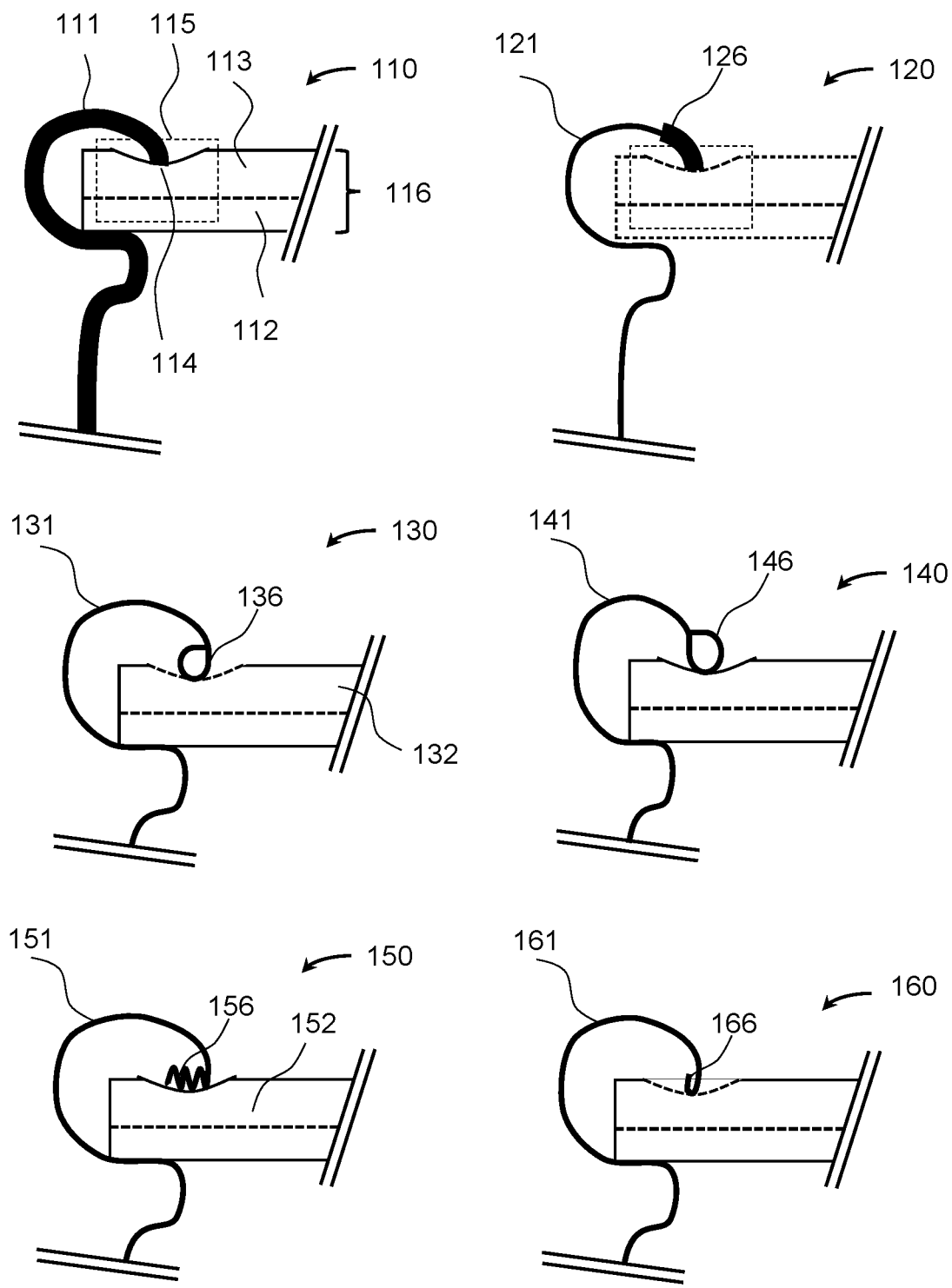
FIG. 1B shows cross-section views of six example sealing techniques for increased edge surface area by preforming.

Reference is now made to FIG. 1B, which shows cross-section views of six example sealing techniques for increased edge surface area by preforming. Seal 110 may comprise a canister 111 with a substantially larger thickness (such as greater than 0.5 mm thick) than may be required for the mechanical integrity of the capacitor in different applications. For example, aluminum electrolytic capacitors up to 3 millifarad and rated for 600 volts may comprise a canister thickness no greater than 0.5 mm, and increasing the thickness above 0.5 mm (such as to 0.55 mm, 0.6 mm, 0.7 mm, 0.8 mm, 0.9 mm, or 1.0 mm) may produce an edge with better sealing performance. Canister 111 may include an edge 114 that may compress an elastomer layer 113 of lid 116. A rigid base 112 of lid 116 may support elastomer layer 113 and provide counter support (such as for force supplied by edge 114), which may restrain the lid and forming the seal. Seal 120 shows a canister 121 that may comprise an edge with a larger thickness than the thickness of the canister 121. For example, a deep drawing method may use dies that shape the canister edge seal 130. The deep drawing method may form an edge 136 by rolling the edge of a canister 131 inward, which may have the advantage of producing a large contact area between edge 136 and elastomer layer 132. Seal 140 may be similar to seal 130, though edge 146 may be formed to roll away from canister 141. Seal 150 may form the edge of canister 151 to produce a corrugated edge 156. Edge 156 may create multiple contact points with elastomer 152. Seal 160 may be formed by folding edge 166 away from canister 161.

Each of capacitor seals 110, 120, 130, 140, 150, or 160 may provide benefits and/or drawbacks. For example, increasing the thickness of the entire canister (such as, as may be shown in seal 110) may allow for a straightforward canister manufacturing technique but may use additional material for the canister. Increasing the thickness of the edge of the canister (as may be shown in seal 120) may have the advantage of using less material for the canister, but may require more elaborate manufacturing using more complex forming, such as using several stages of deep drawing to obtain an increased thickness at the edge. Increasing the contact area of the seal using rolling or folding of the edge (as may be shown in seals 130, 140, 150 or 160) may have the advantage of an increased seal area, such as an increased contact area between the canister edge and elastomer layer of the lid. On the other hand, different tooling stages (such as dies) or a more complicated forming machines may be used for forming the different structures during the seal (which may have particular drawbacks). Seal 130 uses a smaller radius curvature to form a seal edge 136 and a large radius to form seal from canister 131. Seal 130 may be convenient to form, as the rolling of the edge 136 may be in the same direction as the sealing process when rolling the canister 131. Seal 130 may be further from the center axis of the canister making the seal less effective under vibration. Seal 140 may have the seal edge 146 closer to the center axis and therefore may be more effective under vibration, but the reverse orientations in rolling direction may be more complex and time-consuming to form. Seal 150 may use a crimping process (such as alternate folding directions) of edge manufacturing that may require several forming steps, but may offer the advantage of allowing a greater seal area than the other techniques. Seal 160 may use a folding process instead of a rolling process to create a larger seal area. This may have advantages in applications requiring vibration resistance, such as automotive applications.

The mechanical integrity and manufacturing practices for a capacitor may determine a 0.5 millimeter (mm) thickness canister. For example, aluminum electrolytic capacitors for use up to 600 volts are constructed using a 0.4 or 0.5 mm thick canister, and by producing a curled or folded form to the edge as at 130, 140, 150, or 160 may increase the contact area between the edged and the elastomer, thereby creating a better seal.

Figure 1C:
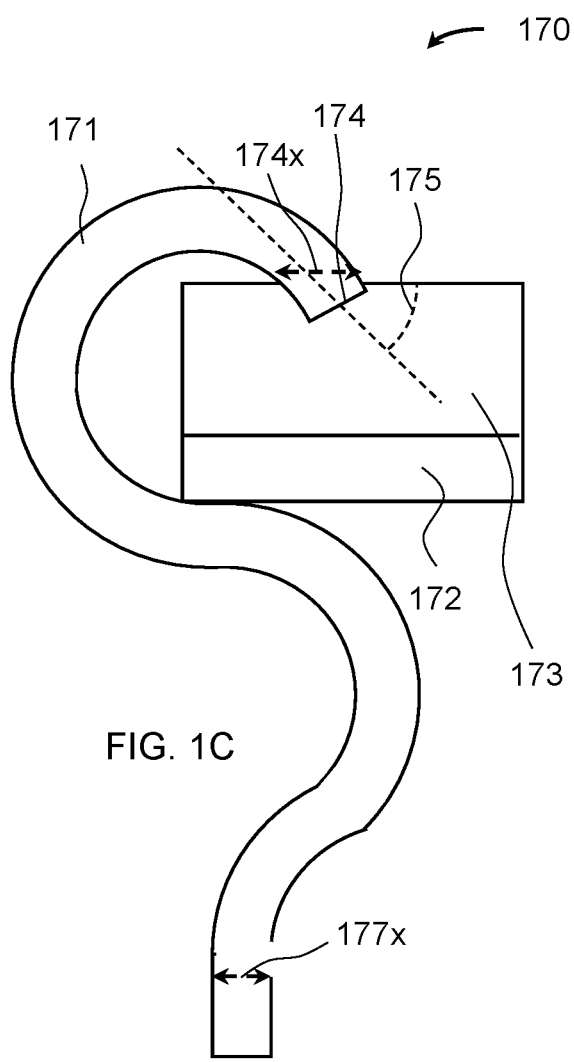
FIG. 1C shows an example sealing technique for increased edge surface area.

Reference is now made to FIG. 1C, which shows an example sealing technique for increased edge surface area. Canister seal 170 may include a canister 171, lid comprising rigid base 172, and/or elastomer layer 173. Canister is configured so that the seal edge 174 may be made at a non-perpendicular angle 175 (such as an angle formed between the edge 174 and the lid surface). Angle 175 may increase the effective seal thickness (for example, effectiveness may be inversely proportional to sin(angle 175)). An angle 175 of 45 degrees may increase the seal edge thickness 174x by 41% over the thickness of the canister 177x. The angle 175 may be between 10 degrees and 80 degrees, and may be determined based on the computation of a seal thickness and target elastomer compression strength. (such as, when only a thickness increase of a few percent is needed) an angle of 80 degrees may be implemented between the edge and the lid, thereby increasing the seal area by 1/sin(80)=1.015 or 1.5% increase. For example, such as if it is determined that the seal thickness should be increased by 15%, an angle of 60 degrees may be implemented between the edge the lid, thereby increasing the seal area by 1/sin(30)=1.155 or 15.5% increase. An angle of 80 degrees may provide 475% increase in seal edge thickness 174x over the case when the angle is 90 degrees, but mechanical stability of lid may be lessened relative to the 90 degree case. For example, angles of less than 45 degrees may be used to promote an increase of effective edge thickness greater than 41%. Similarly to the advantages described above, angle 175 may be greater than 90 degrees, such as between 100 degrees and 170 degrees resulting in similar benefits of between 1.5% and 475% increase in in seal edge thickness 174x over the case when the angle is 90 degrees.

Figure 1D:
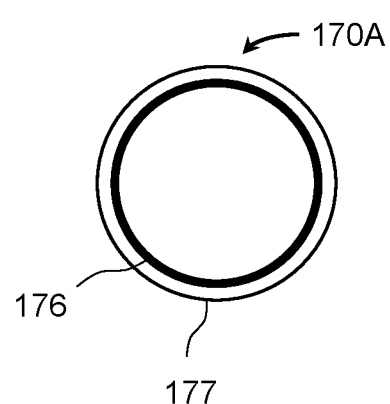
FIG. 1D shows a cross sectional view of a canister with an example sealing technique for increased edge surface area.

Reference is now made to FIG. 1D, which shows a cross sectional view 170A of a canister with an example sealing technique for increased edge surface area. The annular ring 177 may be the cross section of the canister corresponding to location of 177x in FIG. 1C. The annular ring 176 may be the cross section of the annular edge of the canister corresponding to location of 174x in FIG. 1C. The area of 177 may be computed as $\pi(r+t)^2 - \pi r^2 = 2\pi rt - \pi t^2$ where r denotes the radius of the canister and t denotes the thickness 177x of the canister. Since t may be small compared to r, the area may be estimated as $2\pi rt$ as the term $\pi t^2$ may be very small. The area of 176 may be larger than the area of 177, and similarly may be estimated as $2\pi rt_2$ where $t_2$ denotes the increased thickness 174x of annular edge 174 of FIG. 1C. When $t_2 = t$ (no increased thickness) then the area may be $2\pi rt$. By increasing the seal area to be substantially greater than $2\pi rt$, such as by more than 5% greater, the seal may be more effective at preventing drying out of the capacitor.

Figure 1E:
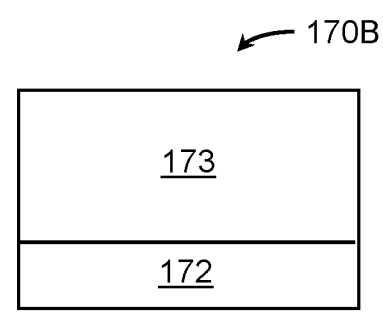
FIG. 1E shows an example lid for increased edge surface area.

Reference is now made to FIG. 1E, which shows an example lid 170B for increased annular edge surface area. The lid 170B comprises an elastomer layer 173 and a rigid base 172. To accommodate an increased surface area of the seal, the material properties, shape, and thickness of the elastomer layer 173 may be modified. For example, the material may be selected to be softer and more compliant such that are more complex edge may be used and the elastomer may comply with the shape of the edge. For example, the shape of the material may be made so that there is room for lateral expansion at the edges of the rigid base. For example, the thickness of the elastomer layer 173 may be increased to support the larger forces used when the surface area of the seal increases. The seal area may be increased by increasing the thickness of the canister (at least at the edge), reducing the angle between the edge and the lid, deforming the edge, or including an annular protuberance of elastomer material at the circumference of the elastomer layer to generate a contact seal with the corner of the edge.

Reference is now made to FIG. 1F, which shows an example sealing technique for increased edge surface area. Canister seal 180 may include a canister 181, and/or a lid. The lid may comprise a rigid base 182 and an elastomer layer 183. Canister seal 180 may further comprise an annular elastomer protuberance (such as, protuberance 184 of FIG. 1G) of the elastomer layer 183, which may be shaped to conform to the curved seal shape leading to the edge. The annular protuberance may have an uncompressed thickness 184H being at least 0.2 mm thicker than a thickness 183H of the elastomer layer 183. The shape of the elastomer protuberance 184 in the uncompressed configuration may be 186A and comprise a height of 184H. The shape of the elastomer protuberance 184 in the compressed configuration may be 186B and comprise a height 186H. The hatched cross section area 186 may represent the compressed portion of the elastomer protuberance 184, where the elastomer protuberance 184 is compressed by the retaining lip (curved portion) of the canister leading to the canister edge.

Reference is now made to FIG. 1G, which shows an example lid including an annular protuberance for increased edge surface area. The thickness difference between 184H and 183H may be between 0.2 mm and 20 mm, depending on the elastomer material properties and the size and shape of the canister 181 of FIG. 1F. For example, when a large canister is used a larger annular protuberance may have the advantage of producing a better seal. When a more compliant (such as softer) elastomer material is used, the elastomer protuberance 184 may be larger than an annular protuberance from a softer elastomer. The design of the annular protuberance is to cause the canister seal (during the sealing process) to compress the elastomer all along the curvature of the rolled canister edge. When canister 181 of FIG. 1F is sealed, the annular protuberance may be compressed between the canister section leading to the canister edge and against an extension 185 of rigid base 182. Extension 185 may be flat or shaped to match a groove of the canister 181 that supports the rigid base. Elastomer protuberance 184 may be formed as an annular ring around the circumference of the lid. Elastomer protuberance 184 may be formed as a folding of the elastomer layer at the circumference of the lid. Elastomer protuberance 184 may be formed as a corrugating of the elastomer layer at the circumference of the lid.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

CLAUSES

Clause 1. A capacitor comprising: a canister comprising an edge; and a lid, comprising an elastomer coating on one surface of the lid, wherein a contact area between the edge and the elastomer coating is greater than an area computed by a formula $2\pi rt - \pi t^2$, wherein r denotes a radius of the canister and wherein t denotes a thickness of the canister.
Clause 2. The capacitor of clause 1, wherein the canister further comprises a base and a cylindrical shell.
Clause 3. The capacitor of clause 2, wherein the cylindrical shell comprises a main wall-portion upstanding at a rust end thereof from the base, an inwardly protruding wall-portion extending from the second end of the main wall-portion, an outwardly protruding wall-portion extending from the inwardly protruding wall-portion and terminating at said edge.
Clause 4. The capacitor of clause 3, wherein the lid is held between (i) the edge, and (ii) an inner surface of the inwardly protruding wall-portion and/or an inner surface of the outwardly protruding wall-portion.
Clause 5. The capacitor of any one of clauses 1 or 2, wherein the edge comprises a thickness greater than a second thickness of the base or a third thickness of the cylindrical shell.
Clause 6. The capacitor of any one of clauses 1 to 3, wherein the contact area is at least 5% greater than the computed area.
Clause 7. The capacitor of any one of clauses 1 to 4, wherein the edge is folded.
Clause 8. The capacitor of any one of clauses 1 to 4, wherein the edge is rolled.
Clause 9. The capacitor of any one of clauses 1 to 4, wherein the edge is corrugated for increasing the contact area.
Clause 10. The capacitor of any one of clauses 1 to 7, wherein an angle between the edge and the lid is 45 degrees.
Clause 11. The capacitor of any one of clauses 1 to 7, wherein an angle between the edge and the lid is between 10 degrees and 80 degrees.
Clause 12. The capacitor of any one of clauses 1 to 7, wherein an angle between the edge and the lid is between 30 degrees and 60 degrees.
Clause 13. The capacitor of any one of clauses 1 to 10, wherein the canister comprises an aluminum material.
Clause 14. The capacitor of any one of clauses 1 to 11, wherein the capacitor is rated for between 125 and 600 volts (V).
Clause 15. The capacitor of any one of clauses 1 to 12, wherein the capacitor comprises a capacitance between 0.5 and 5 milli-farads (mF).
Clause 16. A capacitor canister comprising: a base; a cylindrical surface connected to the base on a circumference of the base; and an annular edge; wherein a thickness of the annular edge is greater than a surface thickness of the cylindrical surface.
Clause 17. The capacitor canister of clause 14, wherein the annular edge is on an opposing end from the base.
Clause 18. The capacitor canister of clauses 14 or 15, wherein the thickness of the annular edge is at least 20% greater than the base thickness or the surface thickness.
Clause 19. The capacitor canister of any one of clauses 14 to 16, wherein the annular edge is folded.
Clause 20. The capacitor canister of any one of clauses 14 to 17, wherein the annular edge is rolled.
Clause 21. The capacitor canister of any one of clauses 14 to 18, wherein the annular edge is corrugated.
Clause 22. The capacitor canister of any one of clauses 14 to 19, wherein the annular edge is shaped by a deep draw process.
Clause 23. The capacitor canister of any one of clauses 14 to 20, wherein the capacitor canister comprises an aluminum material.
Clause 24. The capacitor of any one of clauses 14 to 21, wherein the capacitor is rated for between 125 and 600 volts (V).
Clause 25. The capacitor of any one of clauses 14 to 22, wherein the capacitor comprises a capacitance between 0.5 and 5 milli-farads (mF).
Clause 26. A capacitor comprising a lid, wherein the lid comprises an elastomer layer and an annular protuberance around a periphery of the elastomer layer, wherein a thickness of the annular protuberance is greater than a thickness of the elastomer layer.
Clause 27. The capacitor of clause 24, further comprising a canister comprising an edge, wherein the edge comprises an edge thickness greater than a thickness of the canister.
Clause 28. The capacitor of any one of clauses 24 to 25, wherein an angle between the edge and the lid is 45 degrees.
Clause 29. The capacitor of any one of clauses 24 to 26, wherein an angle between the edge and the lid is between 10 degrees and 80 degrees.
Clause 30. The capacitor of any one of clauses 24 to 27, wherein an angle between the edge and the lid is between 30 degrees and 60 degrees.
Clause 31. A capacitor comprising a canister comprising an edge greater than 0.5 millimeter thick.
Clause 32. A capacitor comprising a canister comprising an edge greater than 0.55 millimeter thick.
Clause 33. A capacitor comprising a canister comprising an edge between 0.5 and 1 millimeter thick.
Clause 34. A capacitor comprising a canister comprising an edge between 0.55 and 1 millimeter thick.
Clause 35. A capacitor comprising (i) a canister comprising an edge, and (ii) a lid, wherein an angle between the edge and the lid is between 10 degrees and 80 degrees.
Clause 36. A capacitor comprising (i) a canister comprising an edge, and (ii) a lid, wherein an angle between the edge and the lid is 45 degrees.
Clause 37. A capacitor comprising (i) a canister comprising an edge, and (ii) a lid, wherein an angle between the edge and the lid is between 30 degrees and 60 degrees.

The invention claimed is:
1. A capacitor comprising:
a canister comprising an edge; and
a lid, comprising an elastomer coating on one surface of the lid, wherein a contact area between a combined surface of the edge and a region of the canister leading up to the edge, and the elastomer coating, is greater than an area computed by a formula $2\pi rt-\pi t^2$, wherein r denotes a radius of the canister and wherein t denotes a thickness of the canister, and wherein an angle between the edge and the lid is between 10 degrees and 80 degrees.

2. The capacitor of claim 1, wherein the canister further comprises a base and a cylindrical shell.

3. The capacitor of claim 1, wherein the contact area is at least 5% greater than the computed area.

4. The capacitor of claim 1, wherein the angle between the edge and the lid is 45 degrees.

5. The capacitor of claim 1, wherein the angle between the edge and the lid is between 30 degrees and 60 degrees.

6. The capacitor of claim 1, wherein the canister comprises an aluminum material.

7. The capacitor of claim 1, wherein the capacitor is rated for between 125 volts and 600 volts.

8. The capacitor of claim 1, wherein the capacitor comprises a capacitance of between 0.5 millifarads and 5 millifarads.

9. A capacitor comprising:
   a canister comprising an edge; and
   a lid comprising an elastomer layer;
   wherein the edge and a region of the canister leading up to the edge are in contact with the elastomer layer to form a seal of the capacitor, and a contact area between a combined surface of the edge and the region of the canister leading up to the edge, and the elastomer layer, is greater than an area computed by a formula $2\pi rt-\pi t^2$, wherein r denotes a radius of the canister and wherein t denotes a thickness of the canister, and wherein an angle between the edge and the lid is between 10 degrees and 80 degrees.

10. The capacitor of claim 9, wherein the canister further comprises a base and a cylindrical shell.

11. The capacitor of claim 9, wherein the contact area is at least 5% greater than the computed area.

12. The capacitor of claim 9, wherein the angle between the edge and the lid is 45 degrees.

13. The capacitor of claim 9, wherein the angle between the edge and the lid is between 30 degrees and 60 degrees.

14. The capacitor of claim 9, wherein the canister comprises an aluminum material.

15. The capacitor of claim 9, wherein the capacitor is rated for between 125 volts and 600 volts.

16. The capacitor of claim 9, wherein the capacitor comprises a capacitance of between 0.5 millifarads and 5 millifarads.

\* \* \* \* \*